United States Patent
Graube

(10) Patent No.: US 6,369,997 B2
(45) Date of Patent: Apr. 9, 2002

(54) CURRENT LIMITER FOR A NETWORK

(75) Inventor: Maris Graube, Forest Grove, OR (US)

(73) Assignee: Relcom, Inc., Forest Grove, OR (US)

( * ) Notice: Subject to any disclaimer, the term of this patent is extended or adjusted under 35 U.S.C. 154(b) by 0 days.

(21) Appl. No.: 09/771,152

(22) Filed: Jan. 26, 2001

Related U.S. Application Data

(63) Continuation of application No. 09/344,408, filed on Jun. 24, 1999.

(51) Int. Cl.⁷ .................................................. H02H 3/00
(52) U.S. Cl. ......................................... 361/93.9; 361/54
(58) Field of Search ............................... 361/62, 63, 65, 361/93.9, 93.1, 56, 57; 379/15, 22, 399, 412, 414; 340/825.06, 825.16; 455/3.3, 3.1

(56) References Cited

U.S. PATENT DOCUMENTS

| | | | |
|---|---|---|---|
| 3,521,087 A | * | 7/1970 | Lombardi .................... 327/322 |
| 3,571,608 A | | 3/1971 | Hurd |
| 4,475,012 A | * | 10/1984 | Coulmance .................. 379/360 |
| 4,724,502 A | | 2/1988 | Kawahira et al. |
| 4,814,932 A | * | 3/1989 | Morelli ........................ 361/63 |
| 5,337,208 A | * | 8/1994 | Hossner ....................... 361/93 |
| 5,706,157 A | * | 1/1998 | Galecki et al. ............... 361/63 |
| 5,781,844 A | * | 7/1998 | Spriester et al. ............. 455/3.3 |

* cited by examiner

Primary Examiner—Kim Huynh
(74) Attorney, Agent, or Firm—Chernoff, Vilhauer, McClung & Stenzel, LLP

(57) ABSTRACT

A current limiter is provided to protect a fieldbus network from electrical shorts in the wiring of the spur cables and network devices attached to the spur cables. In the event of an electrical short, the impedance of the current limiter and the spur connection increases permitting the remainder of the network to continue to function. To facilitate repairs, the current limiter includes an indicator that signals excessive current in the spur.

5 Claims, 3 Drawing Sheets

CURRENT LIMITER FOR A NETWORK

CROSS-REFERENCE TO RELATED APPLICATIONS

This is a continuation of application Ser. No. 09/344,408, filed Jun. 24, 1999.

BACKGROUND OF THE INVENTION

The present invention relates to a fieldbus network and, more particularly, to a current limiter to protect a fieldbus network from an electrical short in a spur cable or a device attached to a spur cable.

In a typical industrial plant application, sensors measure position, motion, pressure, temperature, flow, and other parameters related to the operation of process machinery and activities. Actuators, such as valves and motor controllers, control the operation of the machinery and process activities. The sensors and actuators are remotely located from the human and computerized controllers which gather information from the sensors and direct operation of the actuators. A communication network links the controllers with the sensors and actuators located in the field.

Heretofore, communication between controllers, remote sensors, and actuators in industrial applications has been by means of analog signaling. The prevailing standard for analog networking of field devices and the control room in industrial applications has been the Instrument Society of America standard, ISA S50.1. This ISA standard provides for a two-wire connection between the controller and each field device. One wire of the system carries the analog signal between the remote device and the controller. The analog signal may be converted to a digital signal useful to a computerized controller. The second wire of the circuit supplies DC power for operation of the remote sensor or actuator.

Communication utilizing digital signaling reduces the susceptibility of the communication system to noise and provides a capability for conveying a wide range of information over the communication network. Digital communication also permits several different devices to communicate over a single pair of wires. Remote devices used in connection with a digital communication system typically incorporate local "intelligence." This permits sensors and actuators to perform diagnostic, control, and maintenance functions locally. Further, the local intelligence permits the devices to communicate directly with each other and perform some functions without the necessity of involving a central control facility, thus promoting the development of distributed control systems.

Fieldbus is a generic term used to describe a digital, bidirectional, multidrop, serial communication network for connecting isolated field devices, such as controllers, actuators and sensors, in industrial applications. One such fieldbus is defined by the Instrument Society of America standard, ISA SP50.02. This system utilizes a two-wire bus to provide simultaneous digital communication and DC power to remotely located devices.

While fieldbus installations are as varied as the industrial applications with which they are used, an exemplary fieldbus installation is illustrated in FIG. 1. A twisted pair cable, referred to as the home run 2, connects a digital control system 4 and a DC power supply 6 with a number of devices 8 (actuators, sensors, power supplies, and local controllers) in the field. The digital control system 4 and the DC power supply 6 may be located in a control room 10. The power supply 6 could be located in the field or at a marshaling panel. If wiring runs are long, it may be desirable to power the network from more than one point with additional power supplies 15. A power conditioner 22 is necessary to isolate the DC power supplies from the bus. The DC power supply will attempt to maintain a constant output voltage which, in the absence of isolation, would prevent propagation of the digital signal on the network. The development of the digital fieldbus may also mean that controllers are located in the field.

Several devices 8 can be connected to the home run 2 by spur cables 14 at a terminal referred to as a chicken foot 12 which incorporates signal termination for the home run. A terminator 16 comprising a resistor 18 and a series capacitor 20 connected across the wires of the home run cable 2 must be provided at both ends of the home run cable 2. The varying voltage of the digital signal is produced when an attached device varies the current drawn from the network producing a voltage drop across the resistor 18 of the terminator 16. The capacitor 20 of the terminator 16 prevents dissipation of the DC power through the terminator resistor 18 while permitting transmission of the high frequency digital signal on the bus. In addition, the terminators 16 serve to prevent signals from reflecting from the ends of the home run wires 2.

In addition to the devices connected to the home wiring at a chicken foot, devices can be connected along the home run cable 2 with spur cables 14 that are connected to the home run by spur connectors 13. The chicken foot 12 and the spur connectors 13 provide a convenient means for interconnecting the wires of the home run 2 and the spur cables 14. Heretofore, the positive and negative wires and the shield of the spur cable 14 have been directly connected to the corresponding conductors of the home run cable 2. Direct connection of the individual wires is facilitated by terminals within the chicken foot 2 and spur connection 13 connector blocks. However, if the wiring of a spur cable 14 or a connected device should become shorted, neither the DC power nor the digital signals can be sent over the network and the entire network is disabled. Disabling the network may cause an entire plant or process to be shut down with severe economic consequences. Further, safety may make the ability to continue to monitor and control other parts of the plant or process particularly essential when one part of the system is malfunctioning. The shutting down of the entire network may also make it much more difficult and time consuming to find the short and make repairs.

What is desired, therefore, is an apparatus that causes a network spur to appear as a high impedance in the event of a short circuit in the spur, limiting the current drawn by the spur and permitting the remainder of the network to continue to function. Further, an indicator of abnormal current draw in a spur is desired to facilitate maintenance and repair.

SUMMARY OF THE INVENTION

The present invention overcomes the aforementioned drawbacks of the prior art by providing a fieldbus network comprising a home run conductor; a spur conductor electrically connected to the home run conductor; and a spur current limiter interposed between the spur conductor and the home run conductor. The spur current limiter provides a conduction path between the spur conductor and the home run conductor in which the impedance is varied as a function of the current in the spur conductor. In the event of a short circuit in the wiring of the spur cable or a device attached to the spur cable, the current in the spur conductor will increase causing the impedance of the current limiter to increase. The increased impedance of the conduction path through the current limiter limits the current flow in the spur conductor. During current limiting operation, the current limiter causes the spur to appear as a large impedance so the remainder of the network can continue to function.

A method of connecting a spur cable to a home run of a field bus network is provided comprising connecting a home run conductor to a connecting conductor in a connecting block; connecting a spur cable conductor to an electrically conducting current limiter; and engaging the connecting block and the connecting conductor with the current limiter to electrically connect the spur conductor and the home run conductor. The current requirements of a spur may not be known in advance. Connecting spurs to the home run through a separate current limiter with a plug connector that engages the connecting block permits the use of a universal connecting block in assembling networks with a current limiter selected from a stock for each specific spur's operating current requirement.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENT

Figure 1:
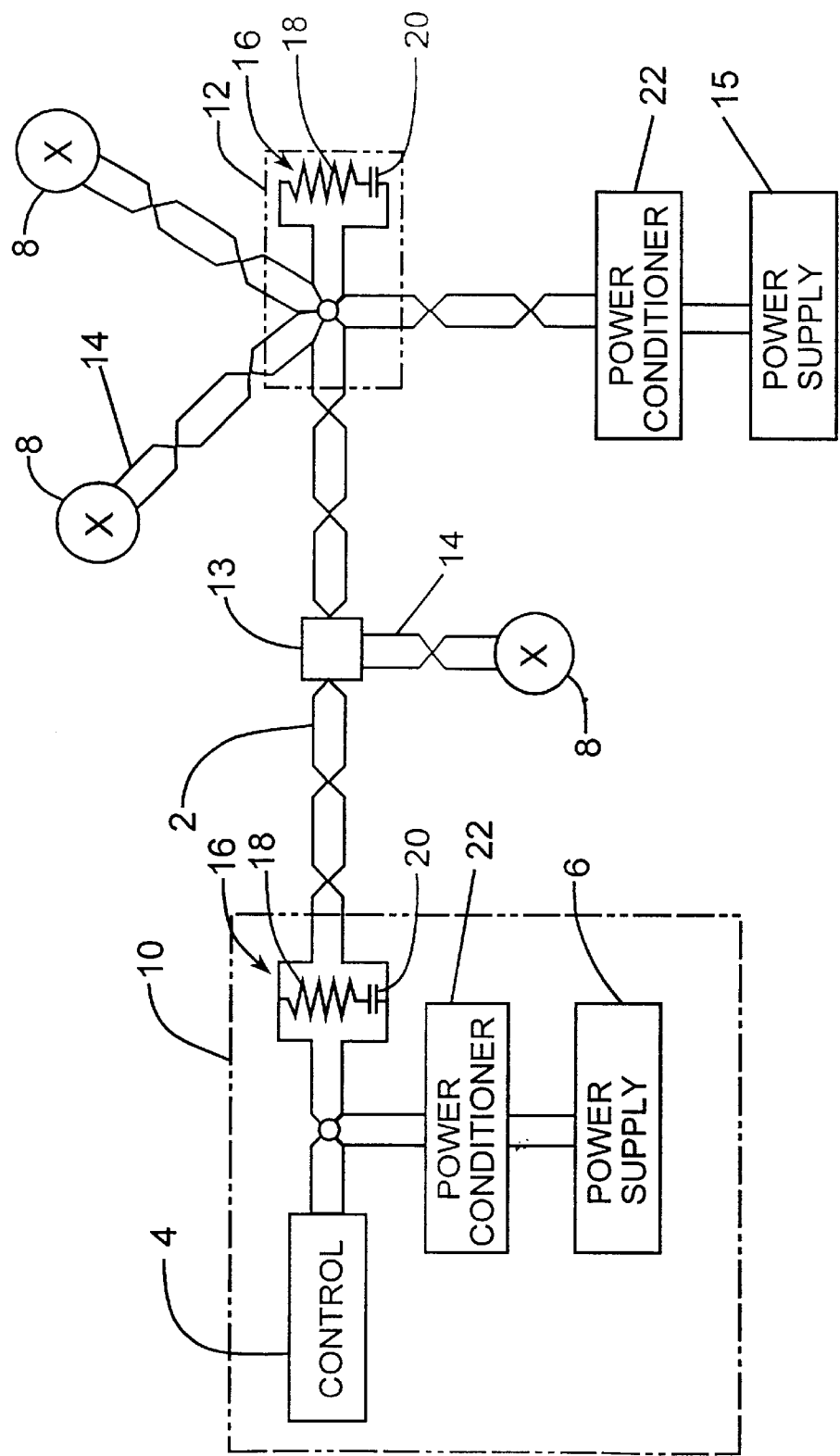
FIG. 1 is a block diagram of an exemplary field bus network installation.

An exemplary fieldbus installation is illustrated in FIG. 1. A shielded, twisted pair cable, referred to as the home run 2, connects a digital control system 4 and a DC power supply 6 with a number of devices 8 (actuators, sensors and local controllers) in the field. The digital control system 4 and the DC power supply 6 may be located in a control room 10. The power supply 6 could be located in the field or at a marshaling panel. If wiring runs are long, it may be desirable to power the network from more than one point with additional power supplies 15. A power conditioner 22 is necessary to isolate the DC power supplies from the bus. The DC power supply will attempt to maintain a constant output voltage which, in the absence of isolation, would prevent propagation of the digital signal on the network. The development of the digital fieldbus may also mean that controllers are located in the field.

Several devices 8 can be connected to the home run 2 by spur cables 14 at a connection block referred to as a chicken foot 12 which incorporates signal termination for the home run. A terminator 16 comprising a resistor 18 and a series capacitor 20 connected across the wires of the home run cable 2 must be provided at both ends of the home run cable 2. The varying voltage of the digital signal is produced when an attached device varies the current drawn from the network producing a voltage drop across the resistor 18 of the terminator 16. The capacitor 20 of the terminator 16 prevents dissipation of the DC power through the terminator resistor 18 while permitting transmission of the high frequency digital signal on the bus. In addition, the terminators 16 serve to prevent signals from reflecting from the ends of the home run wires 2.

In addition to the devices connected to the home run wiring at a chicken foot, devices can be connected along the home run cable 2 with spur cables 14 that are connected to the home run by spur connectors 13. The chicken foot 12 and the spur connectors 13 comprise connection blocks for interconnecting the conductors of the home run 2 and the spur cables 14.

Figure 2:
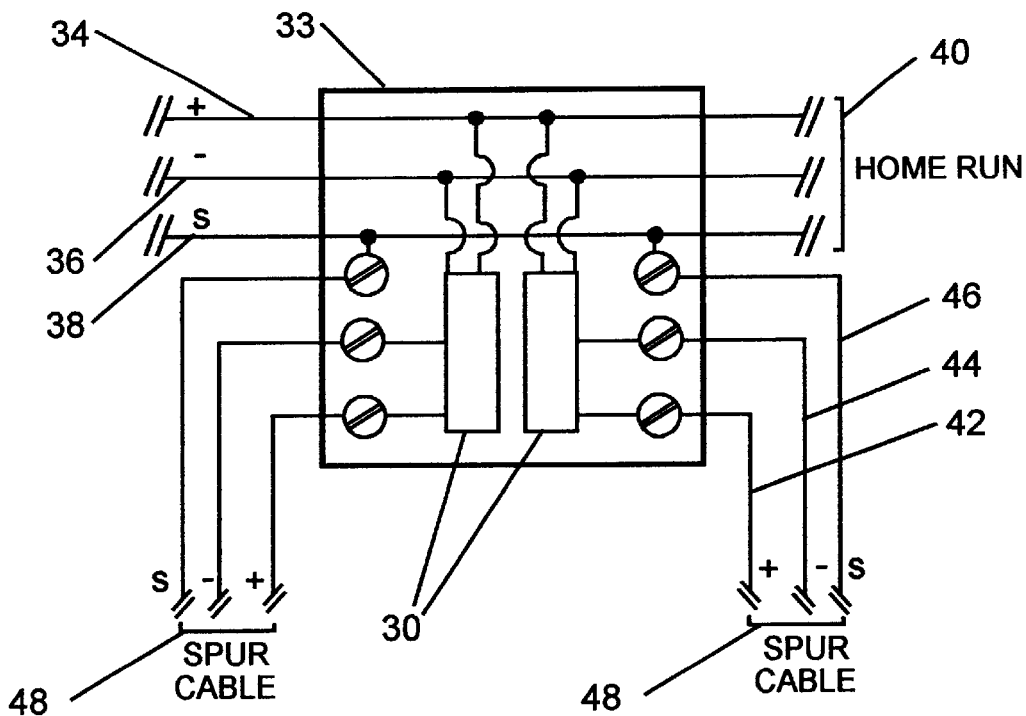
FIG. 2 illustrates a spur cable connection block incorporating the current limiter of the present invention.

Referring to FIG. 2, the current limiter 30 of the present invention can be incorporated into the home run to spur cable connection block 33. As illustrated in FIG. 2, the current limiter 30 is interposed between the positive conductor 34 of the home run cable 40 (indicated by a bracket) and the positive conductor 42 of the spur cable 48 (indicated by a bracket). The negative conductor 36 of the home run 40 and the negative conductor 44 of the spur cable 48 and the shields 38 and 46 are directly connected in the spur cable connection block 33. While the connection block facilitates assembly of the network, the current requirements of the spur may not be known before installation of the network making selection of the correct connection block difficult. Further, if several spurs 48 with different current requirements are connected to a chicken foot connection, a number of different current limiters 30 may be required within a single connection block 33.

Figure 3:
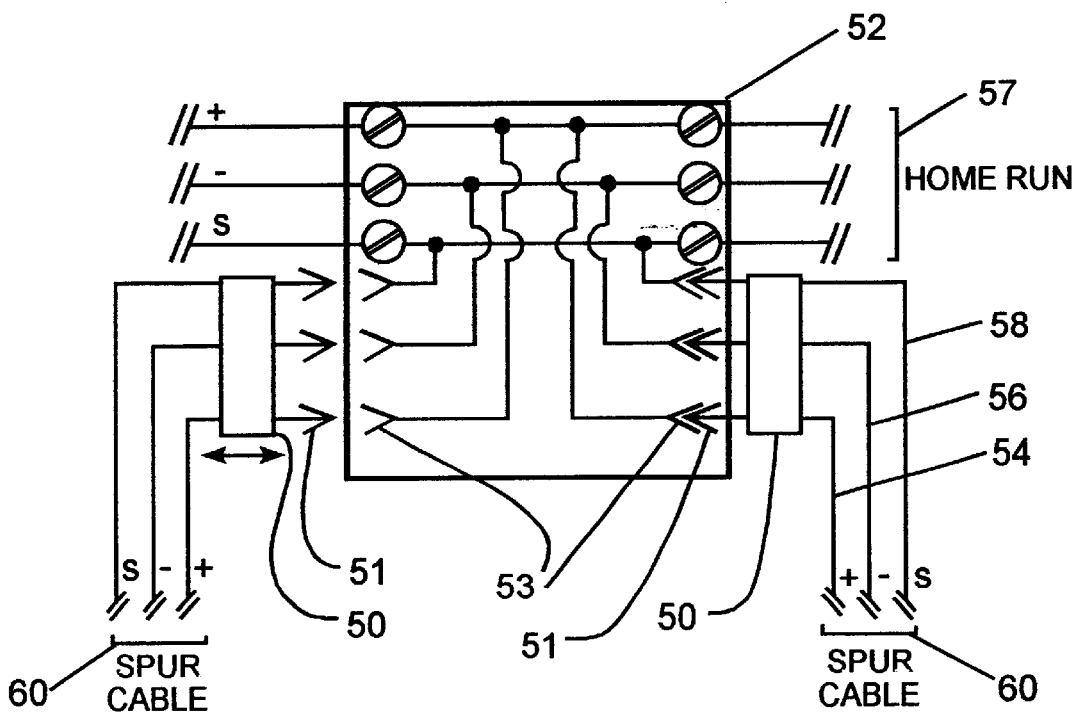
FIG. 3 illustrates a spur cable connection block with a separate, plug connected current limiter.

A second technique for incorporating the spur current limiter into a fieldbus network is illustrated in FIG. 3. The current limiter 50 is incorporated into a separate module which include one half of a plug 51. The connection block 52 incorporates the mating half of the plug connection 53 which is pre-wired to the connections for wires of the home run 57. The current limiter module 50 for a particular spur connection can be selected from a supply of modules with different current limit ratings once the operating current requirement of a particular spur is known. The conductors 54, 56, and 58 of the spur cable 60 can be connected to the current limiter module 50. The module 50 and the connection block 52 can be conveniently connected engaging the mating halves, 51 and 53, of the plug.

Figure 4:
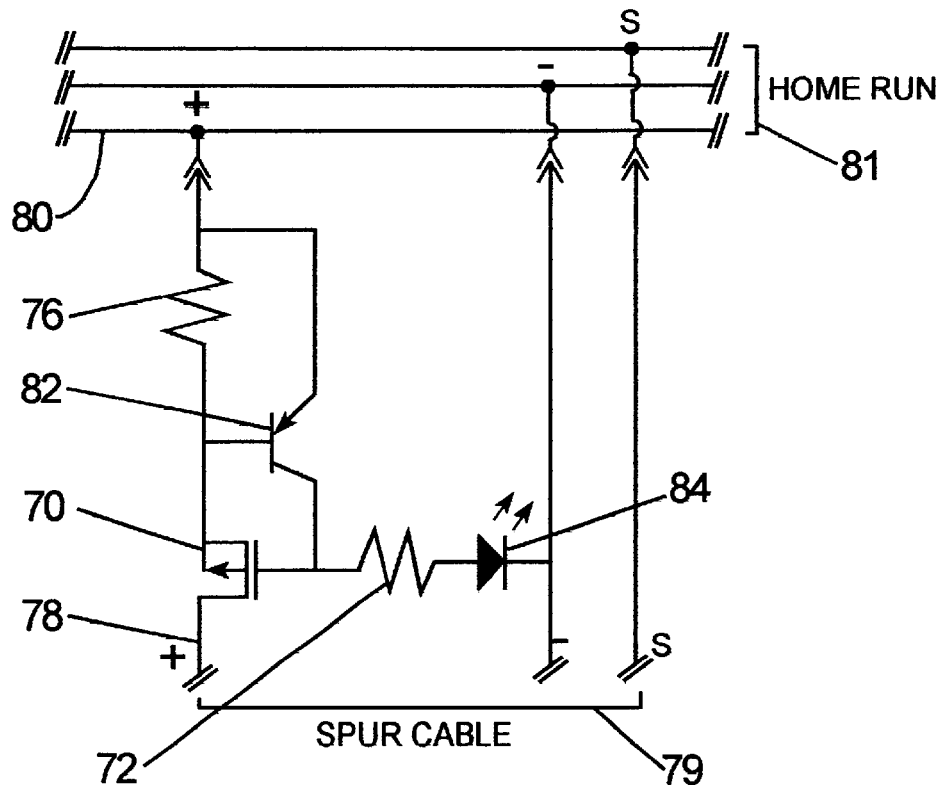
FIG. 4 is a schematic diagram of a current limiter according to the present invention.

A schematic of a circuit for the current limiter of the present invention is illustrated in FIG. 4. While operating at normal spur cable current levels, the voltage at the gate of the field effect transistor (FET) 70 is pulled low through a first resistor 72 and a light emitting diode (LED) 84. This causes the FET 70 to conduct providing a low impedance current path through the second resistor 76 between the positive conductor 78 of the spur cable 79 (indicated by a bracket) and the positive conductor 80 of the home run cable 81 (indicated by a bracket). The voltage drop across the second resistor 76 provides an emitter-base bias signal responsive to current flow in the positive conductor 78 of the spur cable 79 to control conduction of the second transistor 82. The value of the second resistor 76 is selected or adjusted such that under normal current requirements for the spur, the voltage drop across the second resistor 76 is less than the threshold emitter-base voltage of the second transistor 82 and the second transistor 82 does not conduct. Under this condition, the current through the LED 84 is negligible and no light is emitted.

In the event of an electrical short in the spur cable 79 or an attached device, the current flow in the spur cable 79 will increase. With increased current flow through the second resistor 76 the voltage drop across the resistor 76 will increase. When the voltage drop across the second resistor 76 exceeds the threshold emitter-base bias of the second transistor 82, the transistor 82 will conduct. The additional current flowing through the second transistor 82 increases the voltage drop across the first resistor 72 causing an increase in the voltage at the gate of the FET 70. The reduced bias of the FET 70 causes the FET 70 to tend toward an "OFF" state increasing source to drain impedance of the FET 70. The increasing impedance of the FET 70 limits the current that can flow through conductor 78 of the spur cable 79. The source to drain impedance of the FET 70 will increase until the voltage drop across the second resistor 76 is such that the bias signal on the second transistor 82 is at the threshold level. During "current limiting" operation, the spur has the appearance of a high impedance so that dissipation of the DC power is limited and signals on the home run 81 are not attenuated by the short circuit in the spur 79. When the second transistor 82 is conducting sufficient current flows through the first resistor 72 and the LED 84 to cause the LED 84 to emit light, indicating that current demand in the spur cable exceeds a normal operating or nominal level. As result of incorporation of the current limiter into the network, the remainder of the network can continue to function in the event of a short circuit in a spur and repair crews can quickly locate and repair the malfunctioning spur.

Figure 5:
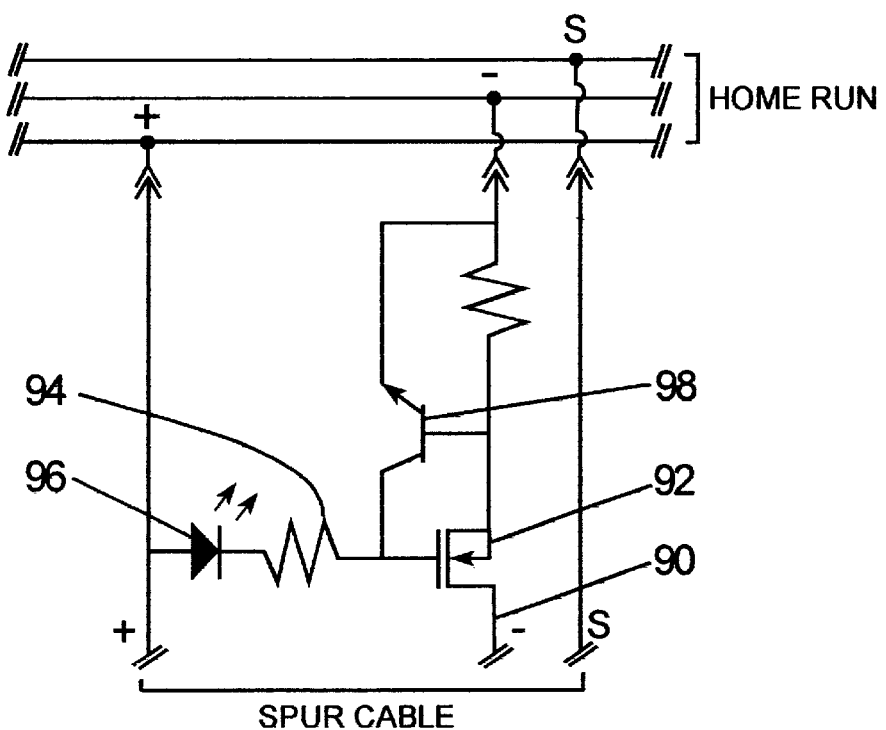
FIG. 5 is a schematic diagram for a current limiter according to the present invention having an alternative circuit to that illustrated in FIG. 4.

FIG. 5 illustrates an alternative equivalent current limiter produced with complementary transistors for the negative conductor of the fieldbus spur cable. In this case, the gate voltage of the FET 92 is raised through the first resistor 94 and the LED 96 causing the FET 92 to conduct. When the current flow in the spur increases, the second transistor 98 turns "ON" lowering the gate voltage of the FET 92 tending to turn it "OFF" increasing the impedance in the spur conductor 90 and limiting current flow.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. An apparatus to limit an electrical current in a spur circuit comprising a first spur conductor and a second spur conductor connected to a home run of a field bus network, said apparatus comprising:

(a) a first transistor connected to vary an impedance of said first spur conductor in response to a voltage differential between a gate of said first transistor and said second spur conductor; and (b) a second transistor connected to vary said voltage differential in response to said current in said first spur conductor.

2. The apparatus of claim 1 further comprising an indicator responsive to said voltage differential to indicate an electrical current in said first spur conductor exceeding a nominal current.

3. An apparatus to limit an electrical current in a circuit including a first conductor at a first electrical potential and a second conductor at a different potential, said apparatus comprising:

(a) a first transistor connected to vary an impedance of said first conductor in response to a potential at a gate of said first transistor, said gate conductively connected to said second conductor; and (b) a second transistor having a first and a second connection to said first conductor and a third connection to said gate of said first transistor; said second transistor varying said potential at said gate of said first transistor in response to a voltage differential between said first and said second connections.

4. The apparatus of claim 3 further comprising a device emitting a signal in response to said potential at said gate of said first transistor.

5. The apparatus of claim 4 wherein said device emitting a signal in response to said potential at said gate of said first transistor comprises a light emitting diode.

* * * * *